US010805783B2

(12) United States Patent
Lemberg et al.

(10) Patent No.: US 10,805,783 B2
(45) Date of Patent: Oct. 13, 2020

(54) DELIVERING WIRELESS EMERGENCY ALERTS CONTAINING HYPERLINKS TO MOBILE WIRELESS DEVICES VIA MOBILE WIRELESS BROADCAST CHANNELS

(71) Applicant: United States Cellular Corporation, Chicago, IL (US)

(72) Inventors: Vyacheslav Lemberg, Long Grove, IL (US); Alexander Mesin, Deer Park, IL (US); Claudio Taglienti, Barrington Hills, IL (US); Narothum Saxena, Hoffman Estates, IL (US); Michael Shannon Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 16/052,874

(22) Filed: Aug. 2, 2018

(65) Prior Publication Data

US 2020/0045526 A1     Feb. 6, 2020

(51) Int. Cl.
*H04W 4/90*  (2018.01)
*H04W 4/06*  (2009.01)
*H04W 4/20*  (2018.01)
*H04L 29/08*  (2006.01)
*H04L 12/58*  (2006.01)

(52) U.S. Cl.
CPC ............. *H04W 4/90* (2018.02); *H04L 51/046* (2013.01); *H04L 51/08* (2013.01); *H04L 51/38* (2013.01); *H04L 67/02* (2013.01); *H04L 67/2809* (2013.01); *H04W 4/06* (2013.01); *H04W 4/20* (2013.01)

(58) Field of Classification Search
CPC ........... H04W 4/90; H04W 4/06; H04W 4/14; H04H 20/59; H04H 20/02; H04M 2242/04; H04M 3/5116; H04M 11/04; G08B 25/016; H04N 21/4882; H04N 21/814; H04N 21/8586; H04N 5/44513
See application file for complete search history.

(56) References Cited

U.S. PATENT DOCUMENTS

| 7,720,431 | B2 | 5/2010 | Lee |
| 7,724,130 | B2 | 5/2010 | Norstrom et al. |
| 8,009,035 | B1 | 8/2011 | Vallaire |
| 8,155,044 | B2 | 4/2012 | Yim et al. |

(Continued)

*Primary Examiner* — Nizar N Sivji
(74) *Attorney, Agent, or Firm* — Leydig, Voit & Mayer, Ltd.

(57) ABSTRACT

A method and cell broadcast center (CBC) system are described for issuing an emergency alert message containing at least one hyperlink corresponding to content stored on a web server. The operations performed by the CBC include receiving an emergency alert message. The emergency alert message includes a hyperlink to web content. The CBC processes the emergency alert message by: issuing a request to a web server for a content corresponding to the hyperlink, and issuing an emergency broadcast request to carrier networks. The emergency broadcast request includes both: the emergency alert message, and the content corresponding to the hyperlink. The issuing the emergency broadcast request, causes delivery of the content corresponding to the hyperlink to a browser cache on a user equipment without user selection of the hyperlink on the user equipment.

20 Claims, 3 Drawing Sheets

(56) References Cited

U.S. PATENT DOCUMENTS

| | | |
|---|---|---|
| 8,653,963 B2 | 2/2014 | Vallaire |
| 8,928,478 B2 | 1/2015 | Vallaire |
| 9,135,808 B2 | 9/2015 | Johnson et al. |
| 9,294,513 B2 | 3/2016 | Lundgren et al. |
| 9,578,661 B2 | 2/2017 | Daly et al. |
| 9,980,110 B2* | 5/2018 | Sennett .................. H04W 4/06 |
| 2006/0156332 A1* | 7/2006 | Kendall ............... G08B 25/085 |
| | | 725/33 |
| 2013/0288633 A1* | 10/2013 | Lemberg ................ H04W 4/90 |
| | | 455/404.1 |
| 2014/0050137 A1* | 2/2014 | Alberth, Jr. ............ H04W 4/06 |
| | | 370/312 |
| 2014/0051379 A1* | 2/2014 | Ganesh ............ H04M 1/72538 |
| | | 455/404.1 |

\* cited by examiner

DELIVERING WIRELESS EMERGENCY ALERTS CONTAINING HYPERLINKS TO MOBILE WIRELESS DEVICES VIA MOBILE WIRELESS BROADCAST CHANNELS

FIELD OF THE INVENTION

This invention relates generally to the field of mobile wireless communications networks. More particularly, the invention is directed to supporting broadcast mobile wireless data communication services in such networks, and more specifically to broadcasting emergency notification alert messages.

BACKGROUND OF THE INVENTION

Mobile wireless systems today provide services going far beyond supporting voice communications. Modern mobile wireless services support a variety of voice and data services. With regard to data services, mobile wireless services support data sessions between data servers and smart mobile wireless devices running a variety of applications including: browsers, email, and text messaging. Several services have been developed to exploit the widespread adoption of data communications capabilities (e.g., text messaging as well as browsers) now incorporated into mobile wireless devices. A particular public service is the Commercial Mobile Alert System (CMAS)—also known as the Personal Localized Alerting Network (PLAN).

CMAS is an outgrowth of a broad initiative, the integrated Public Alert and Warning System (IPAWS). IPAWS was established under an executive order to ensure that the American public promptly receives accurate alerts and warnings, regardless of communications technologies used to transmit the messages. The IPAWS infrastructure includes a mobile wireless alerting capability. Including mobile wireless alerts under the IPAWS system reflects the important role of mobile wireless technologies in disseminating alerts and warnings involving the public well-being. Providing critical alert information via mobile wireless devices enables the public to avoid danger or respond more quickly during crisis—potentially saving lives and preventing property damage. Through IPAWS, numerous public and private industry partners are working together to transform the current national alert and warning system to enable rapid dissemination of authenticated alert information over as many communications pathways as possible.

CMAS is a component of the IPAWS initiative having the goal of establishing an effective alerting network designed for disseminating emergency alerts, via wireless service providers, to mobile wireless devices such as cell phones. The Federal Communications Commission developed CMAS for incorporation into the wireless server provider networks. CMAS enables federal agencies to accept and aggregate alerts from the President of the United States, the National Weather Service (NWS) and emergency operations centers, and send the alerts to mobile wireless service providers. The mobile wireless service providers then broadcast the CMAS alerts to individual mobile wireless devices of subscribers via text (e.g., text messages). The types of alerts that are transmitted via CMAS include the following: alerts issued by the President, alerts relating to threats of physical harm (e.g., severe weather) and AMBER Alerts. CMAS relies upon the collaborative efforts of the Federal Emergency Management Agency (FEMA), the Department of Homeland Security Science and Technology Directorate (DHS S&T), the Alliance for Telecommunications Industry Solutions (ATIS), and the Telecommunications Industry Association (TIA).

CMAS is clearly one of the major components of the IPAWS. The CMAS component provides an interface to participating cellular mobile service providers for delivery of critical alert information to cellular phones in a danger zone. Specifically, the IPAWS CMAS capability will provide Federal, state, territorial, tribal and local government officials the ability to send 90 character, geographically targeted text alerts to the public, warning of imminent threats to life and property. An initial set of requirements of CMAS were developed by an advisory committee established by the FCC in accordance with the Warning, Alert and Response Network (WARN) Act of 2006.

A differentiator of the CMAS capability versus existing subscription-based text messaging alert services currently available in some localities is that the CMAS enables alert messages to be sent to mobile wireless devices within range of broadcasting cellular communications towers. The CMAS also utilizes communications channels and protocols in cellular systems that decrease the impact of network congestion on the ability of transmitters to transmit alert messages during times of emergency.

The IPAWS initiative led to establishing a specification for the interface between a federal alert aggregator/gateway and commercial service provider gateways. In November 2009, the Alliance for Telecommunication Industry Solutions/Telecommunications Industry Association (ATIS/TIA) Joint CMAS Working Group approved the "Joint ATIS/TIA CMAS Federal Alert Gateway to Commercial Mobile Service Providers (CMSP) Gateway Specification" (Specification). The Specification was adopted as the Government Interface Design Specification for the FEMA IPAWS federal alert aggregator/gateway on Dec. 7, 2009.

Thus, in summary the IPAWS initiative gave rise to CMAS. CMAS, in turn, is being established to ensure that emergency alerts and messages are quickly and efficiently disseminated to mobile wireless devices including at least text messaging capability. To that end, CMAS accepts messages from authorized federal, state, territorial, tribal, and local officials and distributes them to participating Commercial Mobile Service Providers (CMSP) for distribution to the public.

Regarding CMAS implementation in the diverse mobile wireless technologies, each cellular network technology (e.g., GSM, CDMA2000, LTE, etc.) has a well defined set of specifications for cell broadcast system. Each cell broadcast system includes an underlying technology for distributing emergency alerts. For example, the CMAS uses the diverse cell broadcast technologies of GSM, CDMA2000, and LTE networks to distribute emergency alerts originated from Federal, State, and Local Government Agencies in accordance with a well-defined emergency alert message interface. CMAS is extendable to handle any new mobile wireless technologies as well.

Thus, a well defined interface exists between the message sources and gateways established by the mobile wireless service providers for broadcasting emergency messages to end users. The present message dissemination architecture is set up for providing text based messages to client devices enabled to communicate with one of the previously mentioned broadcast technologies.

Emergency alerts are currently envisioned to provide far more information than rudimentary information provided in a simple text message. Emergency alerts may indeed contain hyperlinks containing vital information for recipients to provide any of a wide variety of multi-media information (audio, video, documentary, etc.) relating to an emergency alert message. When an emergency alert containing hyperlinks to additional web-based information resources is broadcast to users, the users are expected to click on the link and obtain the linked information. Given the urgency of the information, the alert message is likely to result in large quantities of remotely stored data being downloaded by users within a very short time frame. A combination of high quantities of Internet requests arising from users selecting the embedded hyperlinks and relatively large data file downloads (e.g. an instructional video) may lead to network/server capacity overload. The capacity overload may result in excessive delays by the servers/networks in responding to individual user requests at a time that delays can have serious detrimental consequences.

The congestion is not limited to the geographic region covered by the emergency alert. The sources of the linked multi-media supplemental information can be located virtually anywhere. As such, the requests may originate from a geographic region. However, the effect of the high volume of requests in a very short time period are likely to extend far beyond the geographic area to the various sources of information linked to the initial emergency alert messages received by mobile wireless device users.

BRIEF SUMMARY OF THE INVENTION

A system and method are described for broadcasting emergency alert messages containing hyperlinks to content stored on one or more web servers. The method, performed by a cell broadcast center, includes receiving an emergency alert message at the cell broadcast center issued by an emergency alert system. The emergency alert message includes a hyperlink to web content. The cell broadcast center processes the emergency alert message by: issuing a request to a web server for a content corresponding to the hyperlink, and issuing an emergency broadcast request to carrier networks. The emergency broadcast request includes both: the emergency alert message, and the content corresponding to the hyperlink. The issuing the emergency broadcast request causes delivery of the content corresponding to the hyperlink to a browser cache on a user equipment without user selection of the hyperlink on the user equipment.

The invention further includes a non-transitory computer readable medium including computer-executable instructions that, when executed by cell broadcast center, facilitate performing the above-summarized method.

The invention further includes a cell broadcast center including a processor and a non-transitory computer readable medium including computer-executable instructions that, when executed by the processor of the cell broadcast center, facilitate performing the above-summarized method.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Exemplary embodiments of the invention described herein address a need to ensure that critical, linked, supplemental information in an emergency alert text message is obtainable without significant network delays that potentially arise when an emergency message is issued simultaneously to potentially millions of mobile wireless device users. A significant technological problem arising from embedding hyperlinks (to web pages containing supplemental information) within emergency text messages is that each user selection of an embedded link within a delivered text message results in a separate/distinct server request that must be handled by the mobile wireless network and the source of the linked web page(s). Thus, web servers and mobile wireless networks, during critical initial stages of an emergency, may be overwhelmed by millions of requests for web page content corresponding to the embedded link(s) within an emergency alert. As a consequence, delivery of critical supplemental information may be delayed significantly or not delivered at all when a public emergency arises.

Illustrative examples of a cell broadcast center (CBC) 114 and resulting emergency message handling coordinated by the CBC 114, address the aforementioned technological problem by processing embedded links within a received emergency message prior to forwarding the emergency information to various mobile wireless technology carriers for broadcast to users in an affected geographical area. In accordance with the illustrative examples the CBC 114, in response to initially receiving an emergency alert message, immediately issues (HTTP) requests via the Internet for web server content corresponding to any/all embedded links within the emergency alert message. The CBC 114, upon receiving the web server content, issues a broadcast message(s) containing the web server content to mobile wireless carriers for broadcast to uses within the affected area. As a consequence, potentially millions of mobile wireless device users may receive both an emergency alert message and linked information without processing individual mobile wireless device user requests. Details of configuring and operating the CBC 114 to carry out the above-summarized emergency message processing arrangement are described herein below with reference to illustrative examples.

Figure 1:
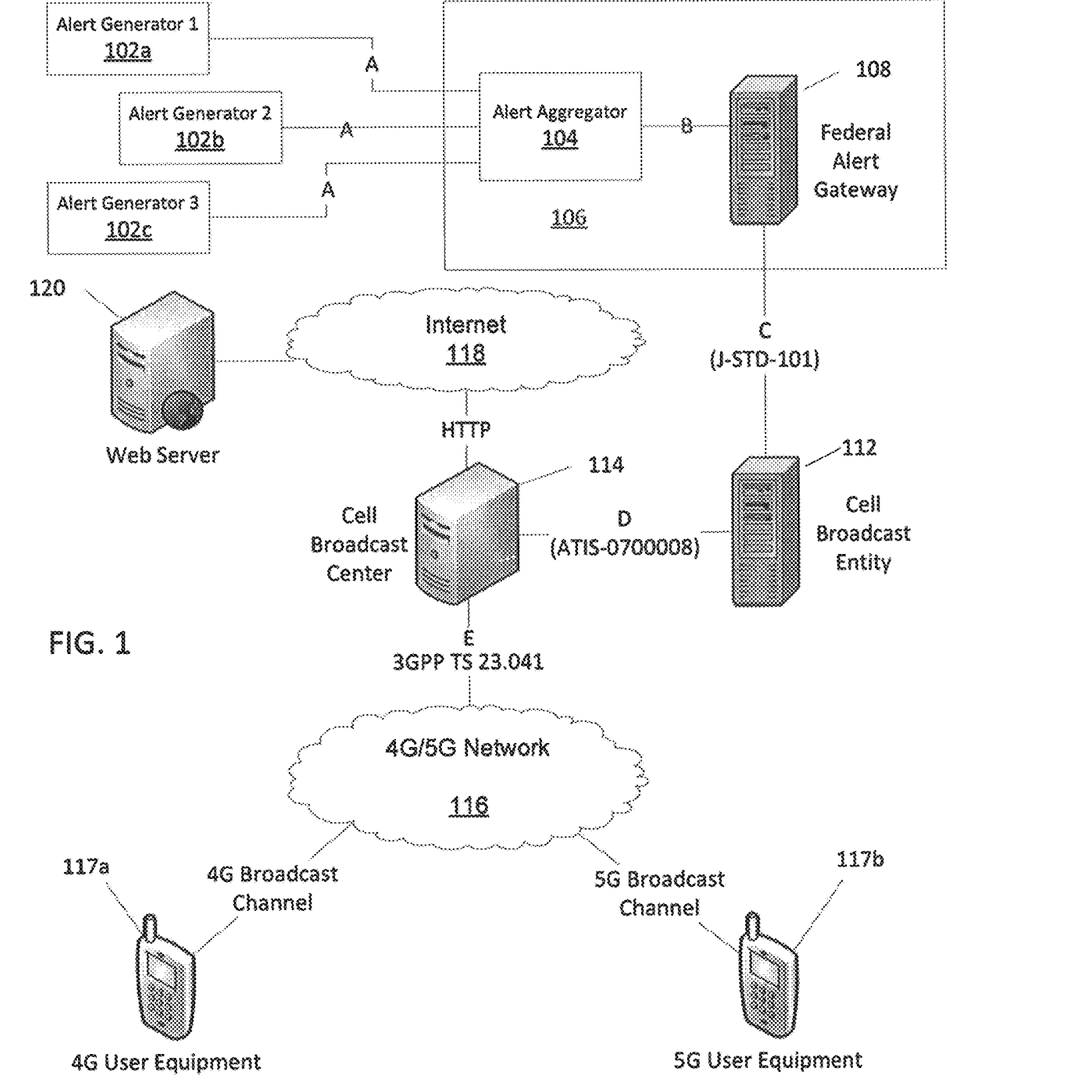
FIG. 1 is an exemplary schematic block diagram depicting an emergency broadcast message distribution infrastructure in accordance with an exemplary embodiment.

Turning to FIG. 1, an exemplary network architecture is schematically depicted. The exemplary network includes alert generators 102a, 102b, and 102c. The alert generators 102a, 102b, and 102c represent, by way of example, Federal, state, local and tribal agencies that are the originators of emergency broadcast messages distributed to mobile wireless device users. An alert aggregator 104 of an FEMA Domain or alerting framework 106 receives the messages originating from the alert generators 102a, 102b and 102c via interface A. Interface A incorporates an XML-based Common Alerting Protocol as specified in ITU-T Recommendation X.1303 (an existing protocol used for submitting emergency alerts). The alerting framework 106 is operated, for example, by an authorized government entity (e.g., FEMA). The alerting framework 106 is, in general, a server (or cluster of servers) that aggregate incoming alert messages from the alert generators 102a, 102b and 102c, and deliver the received alert messages to a Federal Alert Gateway 108 via interface B. Interface B also incorporates the XML-based Common Alerting Protocol as specified in ITU-T Recommendation X.1303.

The Federal Alert Gateway 108 is a server system that is typically administered by a government entity such as FEMA. The alert gateway 108 packages raw alert messages provided by the alert aggregator 104 and transmits the packaged alert messages to commercial mobile wireless service providers including commercial mobile wireless service provider network or domain 110. In the illustrative example, the alert gateway 108 transmits the packaged alert messages via Interface C to a commercial mobile wireless service provider gateway—e.g., a cell broadcast entity (CBE) 112. Interface C is, for example, a point-to-point communication interface that incorporates an XML based protocol developed for handling interactions between the Federal Alert Gateway 108 and the CBE 112. Interface C is standardized under a joint CMAS specification document (J-STD-101) by members of the TIA and the ATIS standards organizations.

Figure 2:
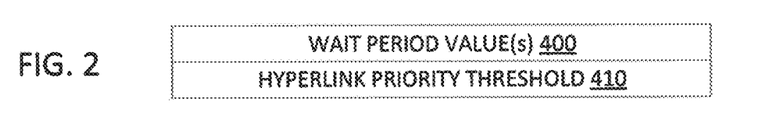
FIG. 2 summarizes configurable fields of the cell broadcast center in accordance with exemplary embodiments of the present invention.

In an illustrative embodiment, the CBE 112 is a specialized application server. The CBE 112 is administered by a commercial mobile wireless service provider. The CBE 112 carries out a store and forward functionality between multiple federal alert message sources, e.g. the Federal Alert Gateway 108, and the CBC 114 via an interface D (e.g. ATIS-0700008). As illustrated in FIG. 2, The CBE 112 communicates with the CBC 114 over an interface D. Interface D is provided, for example, according to the ATIS-0700008 standard, which is a Cell Broadcast Entity to Cell Broadcast Center interface specification. The ATIS-0700008 standard defines a message transfer protocol on the interface between the CBE 112 and the CBC 114 independent of mobile wireless carrier technology. In particular, ATIS-0700008 provides a common interface that is independent of the mobile wireless carrier technologies that subsequently receive emergency alert messages received by the CBC 114 from the CBE 112. The emergency alert messages transmitted via the interface D, in accordance with illustrative examples, may contain one or more hyperlinks to web content stored on a web server 120.

The CBC 114 includes various wireless cellular network support/interface elements for communicating with carrier networks 116 corresponding to each one of multiple types of mobile wireless network carrier technologies. The CBC 114, in an illustrative example, issues emergency alert messages to the various technology-specific ones of the carrier networks 116 via an interface E (e.g. 3GPP TS 23.041). Thereafter, the carrier networks 116 (e.g. 4G/5G wireless networks) forward the emergency alert message to (mobile wireless) user equipment 117a and 117b over their respective mobile wireless technology (e.g., 4G, 5G, etc.) air interface broadcast channels. The wireless technology interfaces may include any of the various mobile wireless communication standards associated with wireless network technologies including: LTE, WCDMA, UMTS, GSM, GPRS, EDGE, Wi-Fi (i.e., IEEE 802.11x), Wi-Max (i.e., IEEE 802.16), or similar telecommunication standards configured to deliver voice and data services to mobile wireless end user devices such as the user equipment 117a and 117b depicted in FIG. 1.

With continued reference to FIG. 1, in accordance with illustrative examples, the CBC 114, upon receiving an emergency alert message from the CBE 112, examines the emergency alert message for embedded hyperlinks. The CBC 114 includes a further interface via the Internet 118 (e.g. HTTP) to request content from the web server 120 corresponding to an embedded hyperlink in the emergency alert message from the CBE 112. The CBC 114 thereafter forwards the retrieved web content for broadcasting to user equipment (e.g., UEs 117a and 117b) via various carrier technologies of the carrier networks 116. The operation of the CBC regarding receiving, processing and forwarding emergency alert messages from Federal. Alert Gateway 108 (via the CBE 112) is discussed in detail herein below.

In a particular illustrative example, the CBC 114 operation is modified to handle the emergency alert message received from the CBE 112 as a hyper text markup language (HTML) document (as opposed to a text message). Moreover, the messages issued by the CBC 114 to the carrier networks 116 for broadcast to the user equipment 117 are provided as HTML documents. Providing emergency alert message and the hyperlinked content in the form of HTML documents (with appropriate descriptive headers notifying the user equipment) ensures that the user equipment processes the received emergency message alerts containing hyperlinks using a web browser technology. The processing of received emergency alert messages using a web browser technology causes the browser to check a browser cache (containing the broadcast linked web content) before issuing a network request for the content corresponding to a hyperlink in the received emergency alert message (HTML document).

By pre-processing the hyperlinks embedded in the received emergency alert messages and broadcasting the corresponding web content as HTML documents that can be stored in browser caches maintained by the browser technologies on the user equipment 117 (without having the user equipment 117 individually request the content), the CBC 114 effectively eliminates network traffic and requests to the web server 120 that would otherwise arise from individual user device requests arising from users selecting the previously embedded hyperlink(s).

Turning now to FIG. 2, an exemplary diagram depicts various data elements maintained by the CBC 114 to support configuring the functions/operations described herein directed to processing and forwarding embedded/linked web content in received emergency alert messages in accordance with illustrative examples. A configurable wait field 400 specifies a value corresponding to a maximum period that the CBC 114 will wait fur requested web content before issuing a received emergency alert message, which contains a hyperlink corresponding to the requested web content, to the carrier networks 116 for broadcast to the user equipment 117 according to the various mobile wireless technologies supported by the carrier networks 116. The configurable wait field 400 may contain multiple wait values, where each one of the multiple wait values corresponds to a maximum wait period for a particular class of alert message containing one or more hyperlinks. A hyperlink priority threshold field 410 may contain a value identifying a hyperlink priority level that defines a minimum priority level of a hyperlink that will cause the CBC 114 to obtain broadcast the corresponding web content to user equipment without waiting for individual user device requests (when users select the hyperlink in a delivered emergency alert message).

Figure 3:
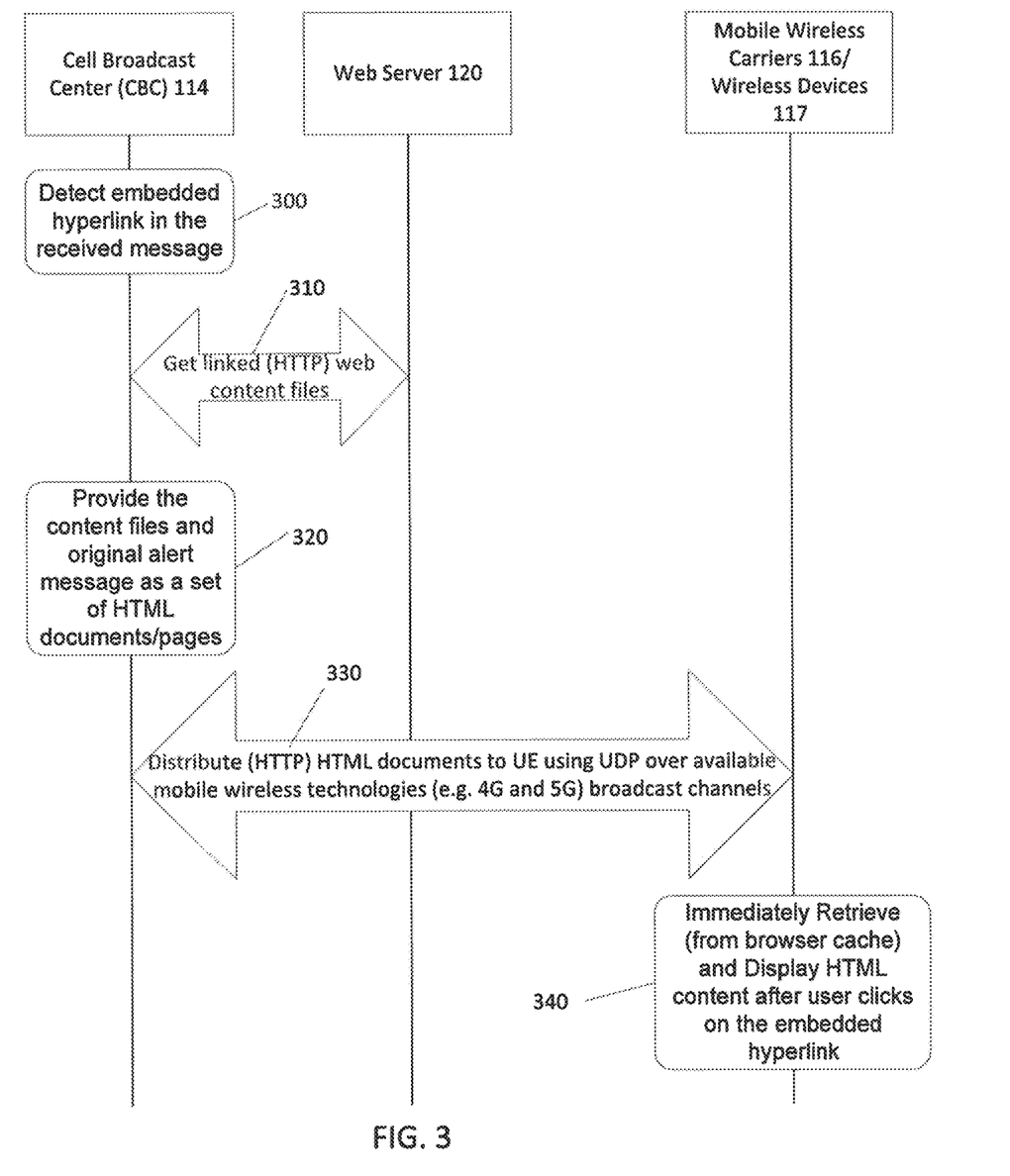
FIG. 3 is a sequence diagram summarizing a set of messaging stages/step associated with the flow of messages between the entities depicted in FIG. 1 in association with the dissemination of a message in accordance with an exemplary embodiment of the present invention.

Turning to FIG. 3, a sequence diagram illustratively depicts the communications/interactions between the CBC 114 and various components of the system in FIG. 1 in association with processing an emergency alert message including an embedded hyperlink. During 300, the cell broadcast center 114, having previously received an emergency alert message issued by the Federal Alert Gateway 108, locates a hyperlink contained in the received emergency message. The presence of such hyperlink invokes configured operations in the CBC 114, carried out via the Internet 118 during 310, to request/obtain web content files from the web server 120. Thereafter, during 320, the CBC 114, packages the originally received emergency alert message and subsequently acquired web content files as HTML documents. The HTML document packaging ensures that the emergency alert and related (hyperlinked) documents are processed by a browser technology upon receipt by the user equipment 117 (via one of the multiple receiving wireless networks 116 corresponding to various supported mobile wireless technologies). During 330, the emergency alert and linked content HTML files are forwarded by the CBC 114 in a broadcast request to the wireless networks 116. The wireless networks 116, in turn, broadcast the HTML files (according to User Datagram Protocol—UDP) to the user equipment (e.g. user equipment 117a and 117b in FIG. 1) according to the various supported mobile wireless technologies (e.g. 4G and 5G).

Upon receiving the broadcast messages from the wireless networks 116, the user equipment 117 process and display the emergency alert messages using invoked browser technologies. Thus, in addition to receiving and displaying the emergency alert message, the user equipment individually store the substantially simultaneously broadcast web content corresponding to the hyperlinks contained within the emergency alert message. Thus, when a user selects a hyperlink on a device display that presents the emergency alert message, the browser technology on the user equipment initially consults a browser cache that, due to the simultaneous transmission of both the emergency alert message and linked web content, already contains the content corresponding to the selected hyperlink. Such avoidance of a separate Internet request for the embedded content may seem trivial on an individual user level. However, when the number of users is potentially thousands or even millions (across a vast geographic area), the potential avoidance of network congestion and server overload is highly valuable in an emergency that may require immediate supplemental information for particular users (thus requiring potentially much user/area specific hyperlinked supplemental content).

Figure 4:
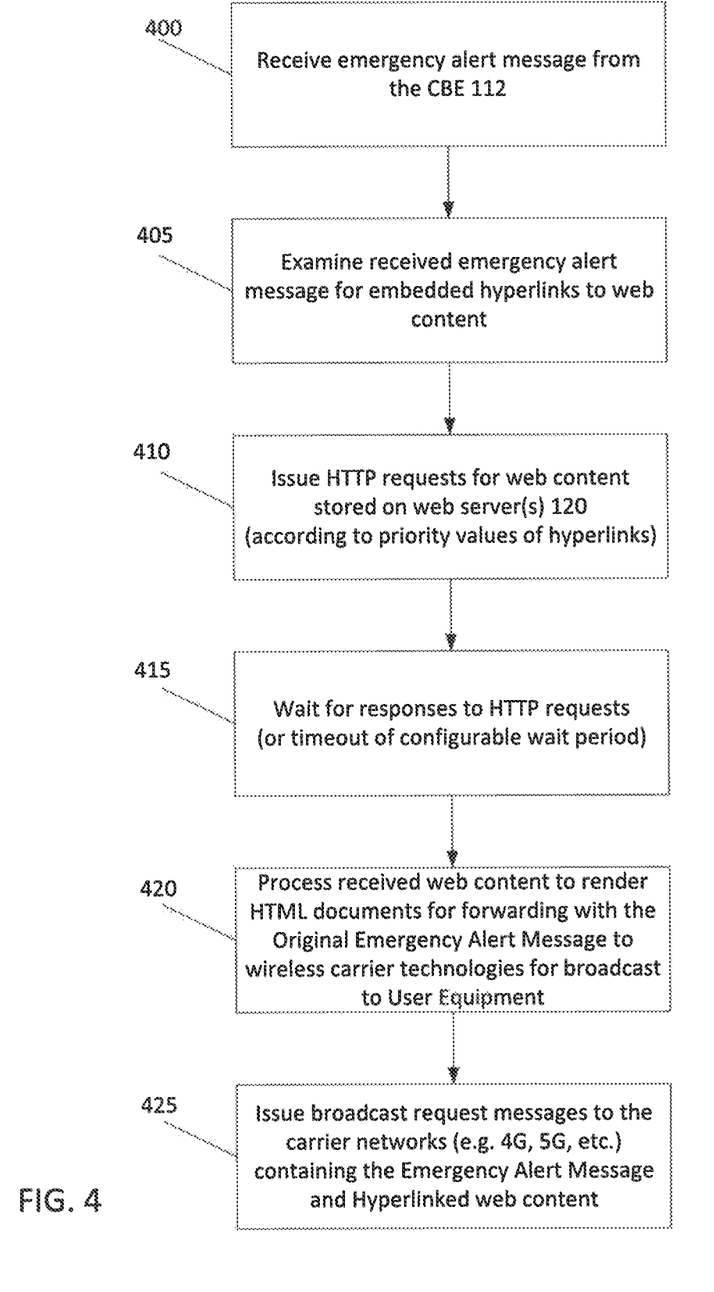
FIG. 4 is a flow chart illustrating steps performed by a cell broadcast center in accordance with an exemplary embodiment the present invention.

Turning to FIG. 4, a flowchart summarizes steps/stages of the operation of the CBC 114 in relation to the sequence of communications depicted in FIG. 3. At 400, the CBC 114 receives an emergency alert message from the CBE 112. Thereafter, at 405, the CBC 114 examines the emergency alert message for embedded hyperlinks for further processing. Upon completion of 405, the CBC 114 has established a list of hyperlinks that were located in/obtained from the received emergency alert message.

During 410, the CBC 114 issues http requests for content stored on a web server (e.g. the web server 120) corresponding to one or more hyperlinks contained in the received emergency alert message. In the illustrative example, the CBC 114 generates and issues an http request for each hyperlink contained in the received message. However, in other illustrative examples, the CBC 114 is further configured to support multiple priority levels, and the CBC 114 carries out processing hyperlinks and conditionally issuing web content requests based upon a priority level value specified within a priority tagged field for a hyperlink that at least meets a configured (potentially dynamically) threshold importance level. The CBC 114 selectively issues http requests only for hyperlinks specifying certain identified priority levels. Moreover, the priority values may be used to establish the order in which corresponding HTTP requests are issued by the CBC 114 to request web content in the event of an emergency alert storm. Thus, the assigned priorities provide a mechanism for effectively handling a sudden large volume of emergency alerts containing hyperlinks to essential supplemental information for users.

At 415, the CBC 114 waits for (and receives) responses to the http requests for web content issued during 410. The wait period expires during the earlier of: (1) receiving responses to all of the web content requests issued during 410, and (2) expiration of a (configurable) wait period. The maximum wait period, in an illustrative example, is a configurable value that may be tied to an urgency level that is expressly indicated by the emergency alert message or implicitly indicated by a high priority level specified by an embedded hyperlink contained in the emergency alert message.

Upon completion of the wait period, during 420, the CBC 114 processes the emergency alert message and web content received during the wait period 415. The alert message is generally not processed (in accordance with emergency alert message processing protocols). However, some minor "packaging" may be performed to render a message that upon receipt by the user equipment 117, is immediately recognized as a document that should be processed according to a browser technology on the user equipment 117 (i.e. one that will consult a browser cache to locate web content identified in an embedded hyperlink). The web content received by the CBC 114 during 415 is also packaged as HTML documents to cause/ensure storage of the web content in browser caches of the user equipment 117.

During 425 the CBC 114 issues broadcast request messages to the mobile wireless technology carriers 116 corresponding to the received/potentially modified emergency alert message and received web content. In the illustrative example, the issued broadcast messages include the potentially modified emergency alert message (the CBC having previously removed the hyperlinks during 420 that correspond to any web content received during 415). Additionally, and without waiting for requests from user devices, the CBC 114 issues broadcast request messages to the mobile wireless technology carries 116 containing the web content received corresponding to hyperlinks previously embedded (extracted during 420) in the emergency alert message.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising,"

"having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Illustrative embodiments of this invention are described herein. Variations of the illustrative embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for issuing, by a cell broadcast center, an emergency alert message containing at least one hyperlink corresponding to content stored on a web server, the method comprising:
   receiving an emergency alert message at the cell broadcast center issued by an emergency alert system, wherein the emergency alert message includes a hyperlink to web content; and
   processing the emergency alert message by:
      issuing a request to a web server for a content corresponding to the hyperlink, and
      issuing an emergency broadcast request to carrier networks including both:
         the emergency alert message, and
         the content corresponding to the hyperlink,
      wherein the issuing the emergency broadcast request, causes a delivery of the content corresponding to the hyperlink to a browser cache on a user equipment, and
      wherein the delivery of the content occurs without user selection of the hyperlink on the user equipment.

2. The method of claim 1 further comprising, after the issuing a request, waiting for at least one of the following events, before performing the issuing an emergency broadcast request, taken from the group consisting of:
   expiration of a wait period; and
   receiving the content corresponding to the hyperlink.

3. The method of claim 1 wherein the emergency alert comprises multiple hyperlinks, and wherein the issuing a request to a web server comprises issuing multiple requests for web pages, each one of the multiple requests for web pages corresponding to one of the multiple hyperlinks.

4. The method of claim 3 wherein each of the multiple hyperlinks has an associated priority, and wherein the issuing multiple requests for web pages is carried out according to the associated priority of each hyperlink.

5. The method of claim 1 wherein the issuing an emergency broadcast request to carrier networks comprises sending the emergency alert message in the form of a hyper text markup language (HTML) document.

6. The method of claim 5 wherein the issuing an emergency broadcast request to carrier networks comprises sending the content corresponding to the hyperlink in a hyper text markup language (HTML) document suitable for processing by a browser technology on a receiving user equipment.

7. The method of claim 1 wherein the cell broadcast center operates as an intermediate processing and routing node interposed between a Federal Alert Gateway and a supported group of mobile wireless carrier networks.

8. A non-transitory computer readable medium including computer executable instructions for performing a method on a cell broadcast center, for issuing an emergency alert message containing at least one hyperlink corresponding to content stored on a web server, wherein the method comprises:
   receiving an emergency alert message at the cell broadcast center issued by an emergency alert system, wherein the emergency alert message includes a hyperlink to web content; and
   processing the emergency alert message by:
      issuing a request to a web server for a content corresponding to the hyperlink, and
      issuing an emergency broadcast request to carrier networks including both:
         the emergency alert message, and
         the content corresponding to the hyperlink,
      wherein the issuing the emergency broadcast request, causes a delivery of the content corresponding to the hyperlink to a browser cache on a user equipment, and
      wherein the delivery of the content occurs without user selection of the hyperlink on the user equipment.

9. The non-transitory computer readable medium of claim 8 further comprising, after the issuing a request, waiting for at least one of the following events, before performing the issuing an emergency broadcast request, taken from the group consisting of:
   expiration of a wait period; and
   receiving the content corresponding to the hyperlink.

10. The non-transitory computer readable medium of claim 8 wherein the emergency alert comprises multiple hyperlinks, and wherein the issuing a request to a web server comprises issuing multiple requests for web pages, each one of the multiple requests for web pages corresponding to one of the multiple hyperlinks.

11. The non-transitory computer readable medium of claim 10 wherein each of the multiple hyperlinks has an associated priority, and wherein the issuing multiple requests for web pages is carried out according to the associated priority of each hyperlink.

12. The non-transitory computer readable medium of claim 8 wherein the issuing an emergency broadcast request to carrier networks comprises sending the emergency alert message in the form of a hyper text markup language (HTML) document.

13. The non-transitory computer readable medium of claim 12 wherein the issuing an emergency broadcast request to carrier networks comprises sending the content corresponding to the hyperlink in a hyper text markup language (HTML) document suitable for processing by a browser technology on a receiving user equipment.

14. A cell broadcast center system for issuing an emergency alert message containing at least one hyperlink corresponding to content stored on a web server, the system comprising:
- a processor; and
- a non-transitory computer readable medium comprising computer-executable instructions that are executed by the processor to facilitate carrying out a method on the cell broadcast center comprising:
- receiving an emergency alert message at the cell broadcast center issued by an emergency alert system, wherein the emergency alert message includes a hyperlink to web content; and
- processing the emergency alert message by:
  - issuing a request to a web server for a content corresponding to the hyperlink, and
  - issuing an emergency broadcast request to carrier networks including both:
    - the emergency alert message, and
    - the content corresponding to the hyperlink,
  - wherein the issuing the emergency broadcast request, causes a delivery of the content corresponding to the hyperlink to a browser cache on a user equipment, and
  - wherein the delivery of the content occurs without user selection of the hyperlink on the user equipment.

15. The system of claim 14 wherein the method further comprises, after the issuing a request, waiting for at least one of the following events, before performing the issuing an emergency broadcast request, taken from the group consisting of:
- expiration of a wait period; and
- receiving the content corresponding to the hyperlink.

16. The system of claim 14 wherein the emergency alert comprises multiple hyperlinks, and wherein the issuing a request to a web server comprises issuing multiple requests for web pages, each one of the multiple requests for web pages corresponding to one of the multiple hyperlinks.

17. The system of claim 16 wherein each of the multiple hyperlinks has an associated priority, and wherein the issuing multiple requests for web pages is carried out according to the associated priority of each hyperlink.

18. The system of claim 1 wherein the issuing an emergency broadcast request to carrier networks comprises sending the emergency alert message in the form of a hyper text markup language (HTML) document.

19. The system of claim 18 wherein the issuing an emergency broadcast request to carrier networks comprises sending the content corresponding to the hyperlink in a hyper text markup language (HTML) document suitable for processing by a browser technology on a receiving user equipment.

20. The system of claim 14 wherein the cell broadcast center operates as an intermediate processing and routing node interposed between a Federal Alert Gateway and a supported group of mobile wireless carrier networks.

* * * * *